United States Patent
Shimano et al.

(10) Patent No.: US 10,662,620 B2
(45) Date of Patent: May 26, 2020

(54) WORK VEHICLE AND METHOD OF CONTROLLING THE SAME

(71) Applicant: KOMATSU LTD., Minato-ku, Tokyo (JP)

(72) Inventors: Yuki Shimano, Tokyo (JP); Takuya Sonoda, Tokyo (JP); Kenji Ohiwa, Tokyo (JP)

(73) Assignee: KOMATSU LTD., Minato-ku, Tokyo (JP)

( * ) Notice: Subject to any disclaimer, the term of this patent is extended or adjusted under 35 U.S.C. 154(b) by 270 days.

(21) Appl. No.: 15/757,085

(22) PCT Filed: Jan. 10, 2017

(86) PCT No.: PCT/JP2017/000413
§ 371 (c)(1),
(2) Date: Mar. 2, 2018

(87) PCT Pub. No.: WO2018/131063
PCT Pub. Date: Jul. 19, 2018

(65) Prior Publication Data
US 2019/0078300 A1 Mar. 14, 2019

(51) Int. Cl.
*E02F 9/22* (2006.01)
*E02F 3/43* (2006.01)
*E02F 9/20* (2006.01)

(52) U.S. Cl.
CPC ............ *E02F 9/2228* (2013.01); *E02F 3/436* (2013.01); *E02F 9/2004* (2013.01);
(Continued)

(58) Field of Classification Search
CPC ... E02F 9/20; E02F 9/22; E02F 9/2228; E02F 3/43
(Continued)

(56) References Cited

U.S. PATENT DOCUMENTS 9,772,018 B2 * 9/2017 Aizawa .................... F16H 39/02
9,850,885 B2 * 12/2017 Sakamoto ........... F15B 11/0423
(Continued)

FOREIGN PATENT DOCUMENTS

JP H05-248404 A 9/1993
JP H09-60033 A 3/1997
(Continued)

*Primary Examiner* — Tan Q Nguyen
(74) *Attorney, Agent, or Firm* — Faegre Drinker Biddle & Reath LLP

(57) ABSTRACT

A work vehicle includes: a hydraulic operation apparatus for operating an actuator; a main controller configured to generate a command current in accordance with an amount of operation of the operation apparatus; an electromagnetic proportional control valve configured to generate command pilot pressure in accordance with the command current; and a main valve configured to adjust a flow rate of hydraulic oil for operating the actuator based on the command pilot pressure. The electromagnetic proportional control valve is provided in a pilot oil passage that connects a pilot pump and a main valve, and configured to utilize hydraulic pressure supplied from the pilot pump to generate command pilot pressure. The operation apparatus is provided in an operation apparatus oil passage that is different from the pilot oil passage.

10 Claims, 7 Drawing Sheets

(52) U.S. Cl.
CPC .......... *E02F 9/2235* (2013.01); *E02F 9/2267* (2013.01); *E02F 9/2296* (2013.01)

(58) Field of Classification Search
USPC .......................................................... 701/50
See application file for complete search history.

(56) References Cited

U.S. PATENT DOCUMENTS

| | | | |
|---|---|---|---|
| 2003/0145721 A1* | 8/2003 | Oka ..................... | E02F 9/2207 91/444 |
| 2004/0083628 A1 | 5/2004 | Hendron | |
| 2010/0228439 A1 | 9/2010 | Nakamura et al. | |
| 2014/0290236 A1* | 10/2014 | Aizawa ................... | F16H 39/02 60/443 |
| 2014/0322045 A1* | 10/2014 | Sakamoto ........... | F15B 11/0423 417/364 |
| 2016/0251835 A1 | 9/2016 | Kitajima et al. | |

FOREIGN PATENT DOCUMENTS

| | | |
|---|---|---|
| JP | H10-317431 A | 12/1998 |
| JP | H11-210710 A | 8/1999 |
| JP | 2004-150262 A | 5/2004 |
| JP | 2008-155898 A | 7/2008 |
| JP | 2014-105791 A | 6/2014 |
| JP | 2015-132090 A | 7/2015 |
| JP | 2016-142285 A | 8/2016 |
| KR | 10-2016-0021073 A | 2/2016 |
| WO | WO-2015/186180 A1 | 12/2015 |

\* cited by examiner

WORK VEHICLE AND METHOD OF CONTROLLING THE SAME

TECHNICAL FIELD

The present invention relates to a work vehicle and a method of controlling the work vehicle.

BACKGROUND ART

As disclosed in International Publication WO2015/186180 (PTD 1), in recent years, a hydraulic excavator serving as a work vehicle is configured such that hydraulic pressure generated in a hydraulic operation apparatus is introduced through a control valve that operates according to an instruction from a controller into a pilot compartment of a directional control valve.

CITATION LIST

Patent Document

PTD 1: International Publication WO2015/186180

SUMMARY OF INVENTION

Technical Problem

In the work vehicle in PTD 1, an operation apparatus is interposed between a hydraulic pressure source and a control valve, so that the hydraulic pressure decompressed in the operation apparatus is transmitted to the control valve. In this way, the hydraulic pressure influenced by the operator's operation of the operation apparatus is transmitted to the control valve. Thus, there is a possibility that the command pilot pressure according to the instruction from the controller cannot be generated in the control valve.

An object of the present invention is to provide: a work vehicle capable of generating command pilot pressure according to an instruction from a controller; and a method of controlling the work vehicle.

Solution to Problem

According to an aspect of the present invention, a work vehicle includes: a hydraulic operation apparatus for operating an actuator; a controller configured to generate a command current in accordance with an amount of operation of the operation apparatus; an electromagnetic proportional control valve configured to generate command pilot pressure in accordance with the command current; and a valve configured to adjust a flow rate of hydraulic oil for operating the actuator based on the command pilot pressure. The electromagnetic proportional control valve is provided in a first oil passage that connects a hydraulic pressure source and the valve, and configured to utilize hydraulic pressure supplied from the hydraulic pressure source to generate the command pilot pressure. The operation apparatus is provided in a second oil passage that is different from the first oil passage.

Advantageous Effects of Invention

According to the present invention, command pilot pressure according to an instruction from the controller can be generated.

DESCRIPTION OF EMBODIMENTS

Figure 1:
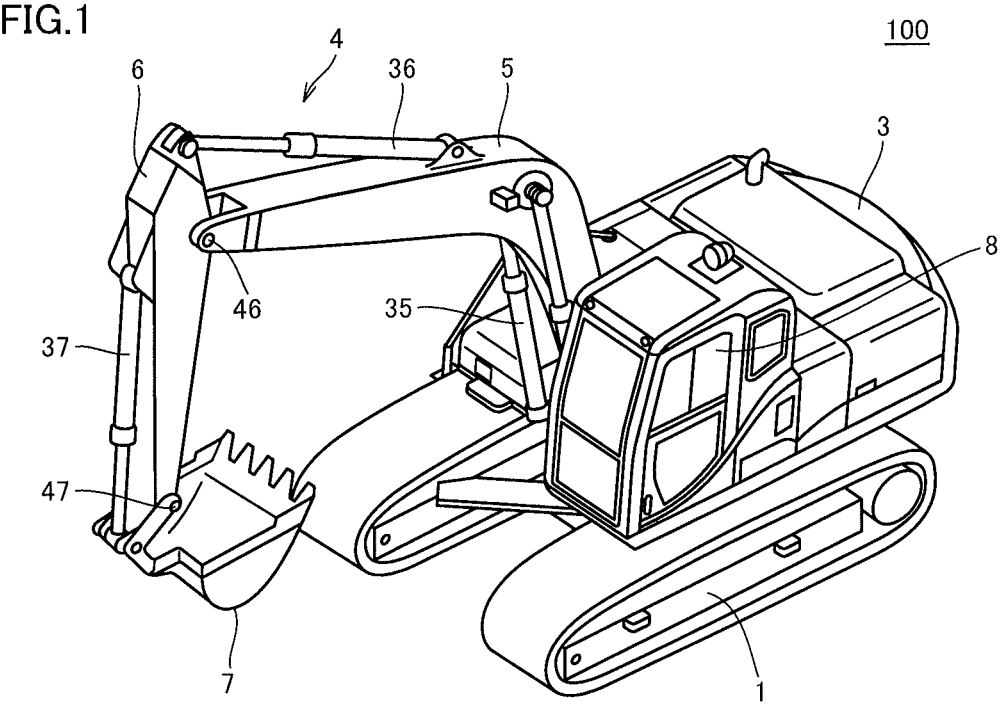
FIG. 1 is a diagram illustrating an external appearance of a work vehicle.

The embodiments will be hereinafter described with reference to the accompanying drawings. In the following description, the same components are designated by the same reference characters. Names and functions thereof are also the same. Accordingly, the detailed description thereof will not be repeated.

It has been originally intended to combine the configurations described in the embodiments as appropriate. Also, some of the components may not be used.

In the following, a work vehicle will be described with reference to the accompanying drawings. In the following description, the terms "upper", "lower", "front", "rear", "left", and "right" indicate the directions with reference to the operator who sits on the operator's seat of the work vehicle.

<A. Entire Configuration>

FIG. 1 is a diagram illustrating an external appearance of a work vehicle 100 according to an embodiment.

As shown in FIG. 1, a hydraulic excavator will be described as an example of work vehicle 100 in the present example.

Work vehicle 100 mainly includes a traveling unit 1, a revolving unit 3, and a work implement 4. The main body of the work vehicle is formed of traveling unit 1 and revolving unit 3. Traveling unit 1 includes a pair of crawler belts on the right and left sides. Revolving unit 3 is mounted so as to be revolvable via a revolving mechanism in an upper portion of traveling unit 1.

Work implement 4 is pivotally supported on revolving unit 3 so as to be operable in the vertical direction, and configured to perform such work as excavation of soil. Work implement 4 includes a boom 5, an arm 6, a bucket 7, a boom cylinder 35, an arm cylinder 36, and a bucket cylinder 37.

Boom 5 has a base portion that is movably coupled to revolving unit 3. Arm 6 has a base end that is pivotably attached to the leading end of boom 5 via an arm pin 46. Arm 6 has a leading end to which bucket 7 is pivotably coupled via a bucket pin 47. Revolving unit 3 also includes an operator's compartment 8 and the like.

Each of boom cylinder 35, arm cylinder 36 and bucket cylinder 37 is an example of an "actuator".

<B. Configuration of Operator's Compartment>

Figure 2:
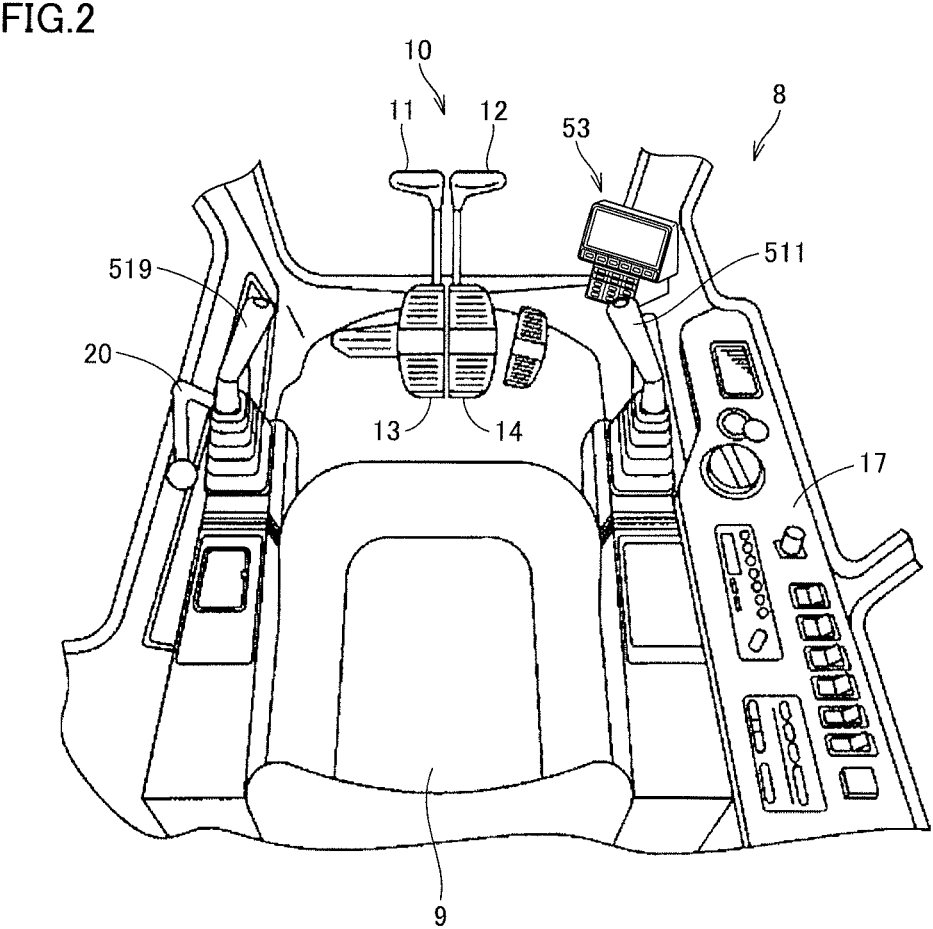
FIG. 2 is a perspective view showing the inner configuration of an operator's compartment.

FIG. 2 is a perspective view showing the inner configuration of operator's compartment 8. As shown in FIG. 2, operator's compartment 8 includes an operator's seat 9, a travel operation unit 10, a dashboard 17, control levers 511, 519, a lock lever 20, and a monitor device 21.

Operator's seat 9 is provided in a central portion of operator's compartment 8. Travel operation unit 10 is provided in front of operator's seat 9.

Travel operation unit 10 includes travel levers 11, 12 and travel pedals 13, 14. Travel pedals 13 and 14 can move together with travel levers 11 and 12, respectively. Traveling unit 1 moves forward when an operator pushes travel levers 11 and 12 forward. Also, traveling unit 1 moves backward when the operator pulls travel levers 11 and 12 backward.

Control lever 511 is provided on the right side of operator's seat 9. The operator operates control lever 511 in the forward and backward directions to thereby allow boom 5 to be moved up and down. The operator operates control lever 511 in the rightward and leftward directions to thereby allow bucket 7 to pivot. For example, control lever 511 is operated in the leftward direction, thereby performing bucket excavation. Control lever 511 is operated in the rightward direction, thereby performing bucket dumping.

Control lever 519 is provided on the left side of operator's seat 9. The operator operates control lever 519 in the forward and backward directions to thereby allow arm 6 to pivot. The operator operates control lever 519 in the rightward and leftward directions to thereby allow revolving unit 3 to revolve.

The above-described operation patterns by control levers 511 and 519 are merely by way of example and not limited thereto.

Lock lever 20 is provided in the vicinity of control lever 519. Lock lever 20 serves to stop such functions as operation of work implement 4, revolution of revolving unit 3, and travel of traveling unit 1.

Monitor device 53 displays the engine state of work vehicle 100, guidance information, warning information, or the like. In addition, monitor device 53 is provided to be able to accept a setting instruction regarding various operations of work vehicle 100.

<C. Hardware Configuration>

Figure 3:
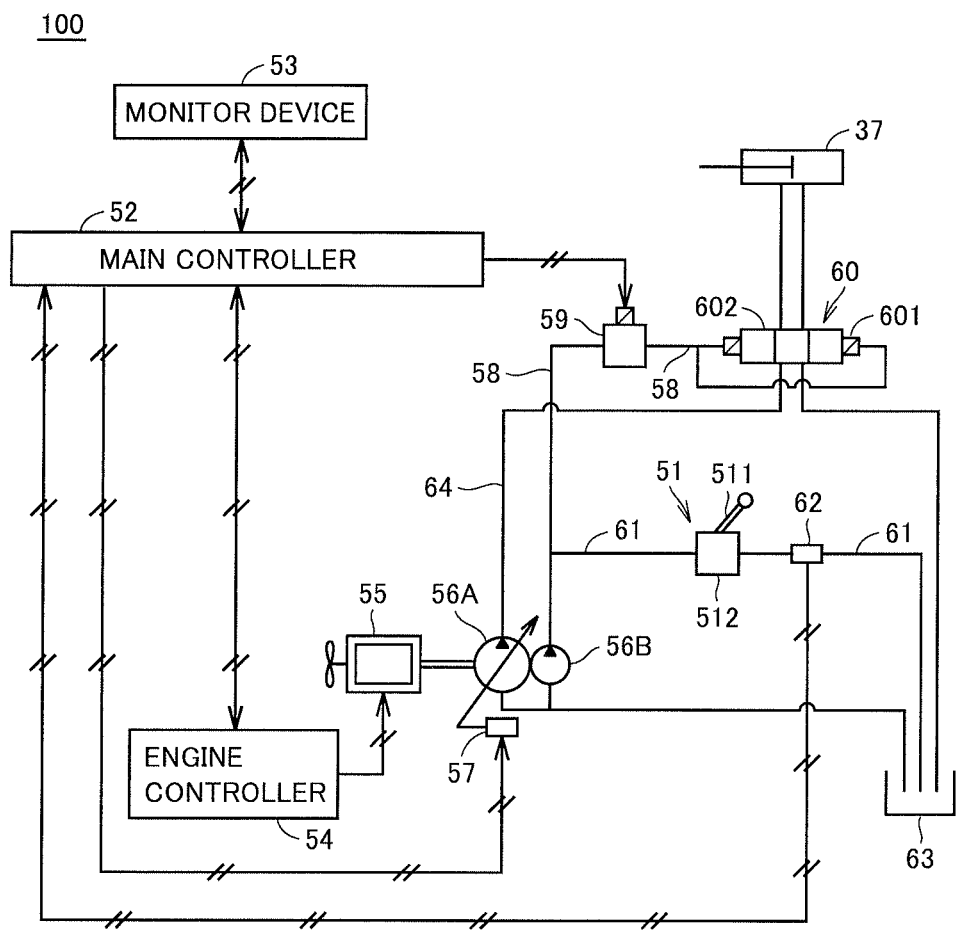
FIG. 3 is a diagram showing the hardware configuration of the work vehicle.

FIG. 3 is a diagram showing the hardware configuration of work vehicle 100.

As shown in FIG. 3, work vehicle 100 includes a bucket cylinder 37, an operation apparatus 51, a main controller 52, a monitor device 53, an engine controller 54, an engine 55, a main pump 56A, a pilot pump 56B, a swash plate drive apparatus 57, a pilot oil passage 58, an electromagnetic proportional control valve 59, a main valve 60, an oil passage 61 for the operation apparatus (hereinafter referred to as an operation apparatus oil passage 61), a pressure sensor 62, a tank 63, and a hydraulic oil passage 64.

Operation apparatus 51 includes a control lever 511 and an operation detector 512 for detecting the amount of operation of control lever 511. Main valve 60 includes a spool 601 and a pilot compartment 602.

Operation apparatus 51 serves to operate work implement 4. In the present example, operation apparatus 51 is provided as a hydraulic apparatus and serves to operate at least bucket cylinder 37. Bucket cylinder 37 is operated to thereby cause bucket 7 to pivot.

Oil is supplied to operation apparatus 51 from pilot pump 56B through operation apparatus oil passage 61. When the operator of work vehicle 100 operates control lever 511 of operation apparatus 51, the oil is discharged into operation apparatus oil passage 61 with the pressure in accordance with the amount of operation of control lever 511.

Pressure sensor 62 detects the pressure of oil that is discharged from operation apparatus 51. Pressure sensor 62 outputs the detection result as an electrical signal to main controller 52.

Monitor device 53 is connected to main controller 52 so as to be communicable with each other. Monitor device 53 notifies main controller 52 about an input instruction from the operator.

Engine 55 has a drive shaft for connection to main pump 56A and pilot pump 56B. Rotation of engine 55 causes the hydraulic oil to be discharged from main pump 56A and pilot pump 56B. Engine 55 is a diesel engine by way of example.

Engine controller 54 controls the operation of engine 55 according to the instruction from main controller 52. According to the instruction from main controller 52, engine controller 54 controls the quantity of fuel and the like injected from the fuel injection apparatus, to thereby adjust the rotation speed of engine 55. Engine controller 54 also adjusts the rotation speed of engine 55 according to the control instruction given from main controller 52 to main pump 56A.

Through hydraulic oil passage 64, main pump 56A supplies the hydraulic oil to be used for driving work implement 4. As an example, main pump 56A supplies hydraulic oil through hydraulic oil passage 64 and main valve 60 to bucket cylinder 37 that serves to drive bucket 7 of work implement 4. Swash plate drive apparatus 57 is connected to main pump 56A. Pilot pump 56B supplies hydraulic oil to electromagnetic proportional control valve 59 and operation apparatus 51.

Swash plate drive apparatus 57 is driven based on the instruction from main controller 52 to change the inclination angle of the swash plate of main pump 56A.

Main controller 52, which serves to control the entire work vehicle 100, is formed of a central processing unit (CPU), a non-volatile memory, a timer, and the like. Main controller 52 controls engine controller 54 and monitor device 53.

Main controller 52 receives an electrical signal from pressure sensor 62. Main controller 52 generates a command current in accordance with this electrical signal. In this way, main controller 52 generates a command current in accordance with the amount of operation of operation apparatus 51. Main controller 52 outputs the generated command current to electromagnetic proportional control valve 59.

Although main controller 52 and engine controller 54 are separate from each other in the present example, one common controller can also be provided.

Electromagnetic proportional control valve 59 is provided in pilot oil passage 58 that connects pilot pump 56B and pilot compartment 602 of main valve 60. This electromagnetic proportional control valve 59 utilizes the hydraulic pressure supplied from pilot pump 56B to generate command pilot pressure in accordance with the command current from main controller 52. Electromagnetic proportional control valve 59 drives spool 601 of main valve 60 with the command pilot pressure. In this way, based on the command current, electromagnetic proportional control valve 59 generates command pilot pressure that is to be guided to main valve 60.

Main valve 60 is provided between electromagnetic proportional control valve 59 and bucket cylinder 37 that causes bucket 7 to pivot. Based on the command pilot pressure generated by electromagnetic proportional control valve 59, main valve 60 adjusts the flow rate of the hydraulic oil for operating bucket cylinder 37. In the present embodiment, the hydraulic oil of the amount in accordance with the position of spool 601 is supplied from main valve 60 to bucket cylinder 37, thereby causing bucket 7 to pivot.

Tank 63 is configured to store oil that is used by each of main pump 56A and pilot pump 56B. The hydraulic oil discharged from main pump 56A flows through bucket cylinder 37 and main valve 60 and is returned to tank 63. The oil discharged from pilot pump 56B flows through operation apparatus 51 and is returned to tank 63.

As described above, electromagnetic proportional control valve 59 is provided in pilot oil passage 58 that connects pilot pump 56B serving as a hydraulic pressure source and main valve 60. Also, this electromagnetic proportional control valve 59 is configured to utilize the hydraulic pressure supplied from pilot pump 56B to generate command pilot pressure. Operation apparatus 51 is provided in operation apparatus oil passage 61 that is different from pilot oil passage 58. Oil is supplied to operation apparatus 51 from pilot pump 56B through operation apparatus oil passage 61. Also, the oil having passed through operation apparatus 51 is prevented from flowing into pilot oil passage 58 and hydraulic oil passage 64, but is returned to tank 63.

Operation apparatus 51, which serves as a hydraulic operation apparatus as described above, functions as a pseudo electric lever-type operation apparatus in work vehicle 100. Such operation apparatus 51 has the following advantages as compared with an electric lever-type operation apparatus. Since the movement of control lever 511 of operation apparatus 51 is transmitted to main controller 52 through hydraulic pressure, the operational feeling in accordance with the hydraulic pressure pilot system employed in the conventional hydraulic excavator can be maintained.

Main valve 60, the hydraulic pressure source, pilot oil passage 58, and operation apparatus oil passage 61 are examples of a "valve", a "pilot pump 56B", a "first oil passage", and a "second oil passage", respectively.

<D. Summary of Bucket Control>

Work vehicle 100 has an automatic land grading assistance function. The "automatic land grading assistance function" is to automatically raise boom 5 such that bucket 7 moves along the design surface when arm 6 is operated. Work vehicle 100 has a bucket control function. The "bucket control function" is to keep the bucket angle relative to the main body of work vehicle 100 constant. The bucket control function is performed in the state where the automatic land grading assistance functions.

Figure 4:
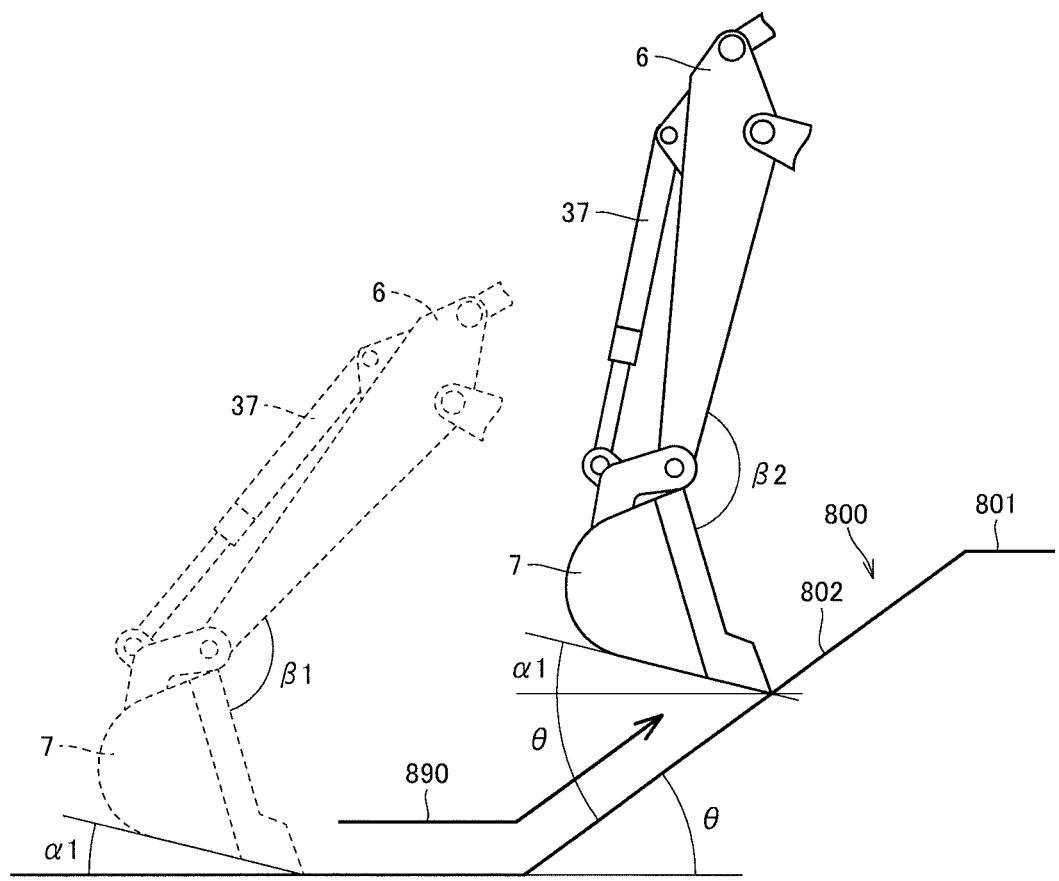
FIG. 4 is a diagram for illustrating a bucket control function.

FIG. 4 is a diagram for illustrating the bucket control function.

As shown in FIG. 4, when bucket 7 is moved along a design surface 800 in the direction indicated by an arrow 890, work vehicle 100 keeps a bucket angle α relative to the main body of work vehicle 100 (angle α1 in FIG. 4) constant by the bucket control function. It is to be noted that the main body (not shown) of work vehicle 100 is disposed in a horizontal place 801 on design surface 800.

When work vehicle 100 levels an inclined surface 802 of design surface 800, on the condition that inclined surface 802 is inclined at an angle θ, the bucket angle relative to inclined surface 802 is "α1+θ" while bucket angle α relative to the main body of work vehicle 100 is kept constant (at α1) as described above.

According to the bucket control function, the inclination of the floor surface of bucket 7 is kept constant in the coordinate system of the vehicular body. In addition, an angle β formed between bucket 7 and arm 6 sequentially changes, as illustrated as β1 and β2 in the figure.

The following is an explanation about the configuration of work vehicle 100 in which the bucket control function is turned on or off automatically in conjunction with the operator's operation.

The bucket control function is an example of the "automatic control function".

<E. Functional Configuration of Main Controller>

Figure 5:
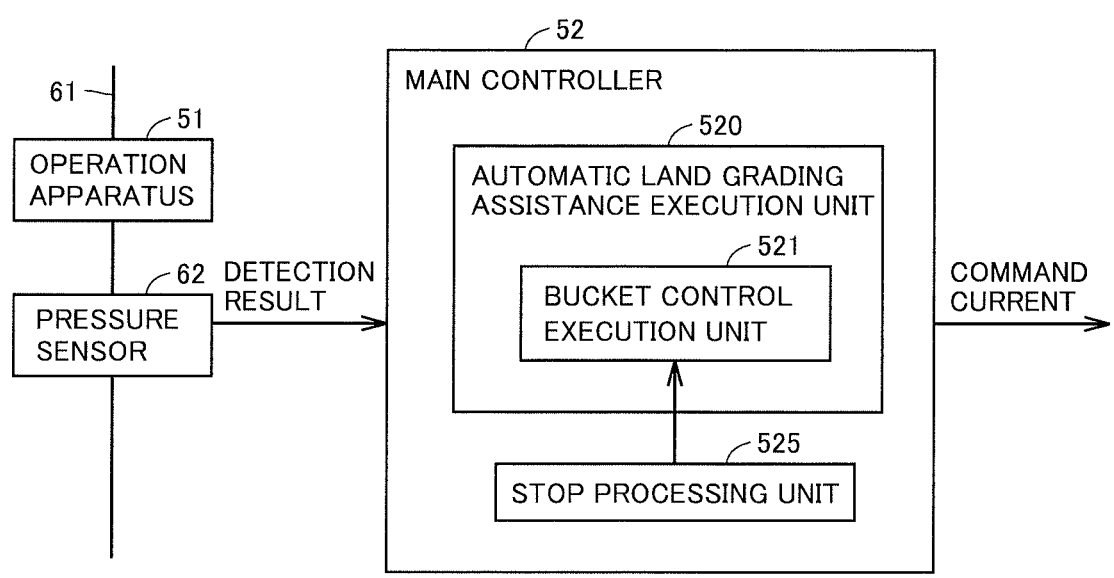
FIG. 5 is a functional block diagram for illustrating the functional configuration of a main controller.

FIG. 5 is a functional block diagram for illustrating the functional configuration of main controller 52.

As shown in FIG. 5, main controller 52 includes an automatic land grading assistance execution unit 520 and a stop processing unit 525. Automatic land grading assistance execution unit 520 has a bucket control execution unit 521.

On the condition that the operator selects the operation mode in which the automatic land grading assistance function is performed, automatic land grading assistance execution unit 520 performs control for executing the automatic land grading assistance function.

In the operation mode in which the automatic land grading assistance function is performed, on the condition that the operator selects the operation mode in which the bucket control function is performed, bucket control execution unit 521 performs control for executing the bucket control function.

When stop processing unit 525 accepts the operator's operation (lever operation) for operation apparatus 51 during execution of the bucket control function, it temporarily stops the bucket control function. In this case, main controller 52 causes bucket 7 to pivot based on this operator's operation.

When the operator's operation is ended, main controller 52 keeps the bucket angle that is formed when the operator's operation is ended. In this state, the bucket control function is then resumed.

In this way, when operation apparatus 51 accepts the operator's operation during execution of the bucket control function, main controller 52 changes the bucket angle relative to the main body of work vehicle 100 to the angle based on the operator's operation.

In addition, based on the detection result from pressure sensor 62, main controller 52 determines whether operation apparatus 51 is operated or not during execution of the bucket control function. Furthermore, bucket angle α is changed by controlling the current that is output to electromagnetic proportional control valve 59.

As described above, in work vehicle 100, during execution of the bucket control function, the operator's operation is prioritized over execution of the bucket control function.

<F. Control Structure>

Figure 6:
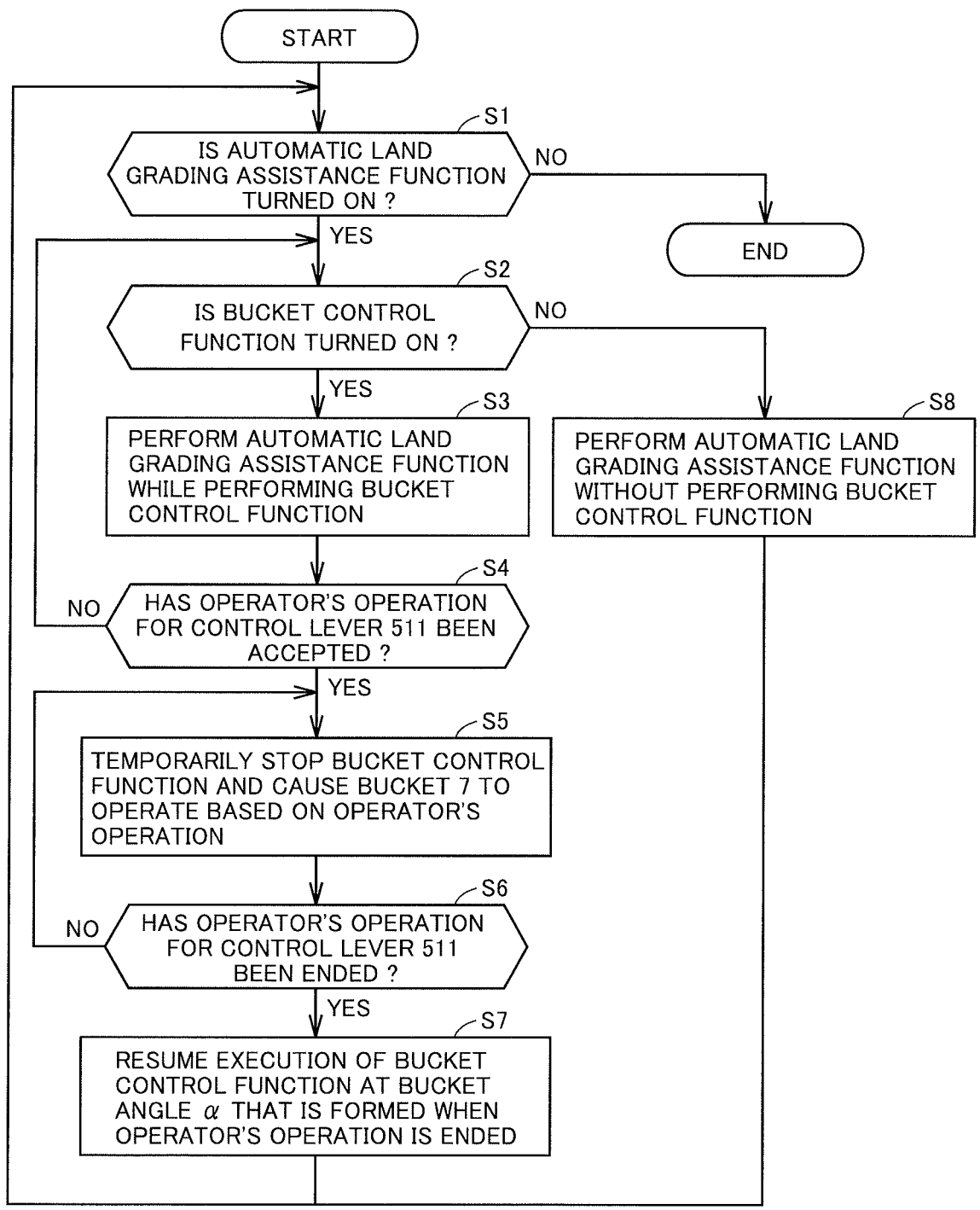
FIG. 6 is a flow chart for illustrating a process flow in the work vehicle.

FIG. 6 is a flow chart for illustrating a process flow in work vehicle 100.

As shown in FIG. 6, in step S1, main controller 52 determines whether or not the current operation mode is an operation mode in which the automatic land grading assistance function is performed. When main controller 52 determines that the current operation mode is an operation mode in which the automatic land grading assistance function is performed (YES in step S1), it determines in step S2 whether or not the current operation mode is an operation mode in which the bucket control function is performed. When main controller 52 determines that the current operation mode is not an operation mode in which the automatic land grading assistance function is performed (NO in step S1), it ends a series of processes.

When main controller 52 determines that the current operation mode is an operation mode in which the bucket control function is performed (YES in step S2), then in step S3, it performs the automatic land grading assistance function while performing the bucket control function. When main controller 52 determines that the current operation mode is not an operation mode in which the bucket control function is performed (NO in step S2), then in step S8, main controller 52 performs the automatic land grading assistance function without performing the bucket control function.

In step S4, main controller 52 determines whether the operator's operation for control lever 511 has been accepted or not. When main controller 52 determines that the operator's operation has been accepted (YES in step S4), then in step S5, it temporarily stops the bucket control function, and causes bucket 7 to pivot based on the operator's operation. When main controller 52 determines that the operator's operation has not been accepted (NO in step S4), it returns the process to step S2.

In step S6, main controller 52 determines whether the operator's operation for control lever 511 has been ended or not. When main controller 52 determines that the operator's operation has not been ended (NO in step S6), it returns the process to step S5. When main controller 52 determines that the operator's operation has been ended (YES in step S6), then in step S7, it resumes execution of the bucket control function at bucket angle α that is formed when the operator's operation is ended. Thereby, when the bucket control function is resumed, the bucket angle formed when the operator's operation is ended is kept.

<G. Advantage>

The advantage obtained by the above-described configuration will be hereinafter described.

(1) As shown in FIG. 3, work vehicle 100 includes: a hydraulic operation apparatus 51 for operating bucket cylinder 37; a main controller 52 configured to generate a command current in accordance with the amount of operation of operation apparatus 51; an electromagnetic proportional control valve 59 configured to generate command pilot pressure in accordance with the command current; and a main valve 60 configured to adjust the flow rate of the hydraulic oil for operating bucket cylinder 37 based on the command pilot pressure.

Electromagnetic proportional control valve 59 is provided in pilot oil passage 58 that connects pilot pump 56B serving as a hydraulic pressure source and main valve 60. Also, electromagnetic proportional control valve 59 is configured to utilize the hydraulic pressure supplied from pilot pump 56B to generate command pilot pressure. Operation apparatus 51 is provided in operation apparatus oil passage 61 that is different from pilot oil passage 58.

According to such a configuration, electromagnetic proportional control valve 59 is provided in an oil passage that is different from the oil passage in which operation apparatus 51 is provided. Thus, the above-described configuration is different from the configuration in which an electromagnetic proportional control valve is provided downstream of the operation apparatus. Thereby, the hydraulic pressure of the oil supplied to electromagnetic proportional control valve 59 is not influenced by the amount of operation of operation apparatus 51. The command pilot pressure is not decompressed in operation apparatus 51, and the hydraulic pressure from pilot pump 56B is directly transmitted to electromagnetic proportional control valve 59. Thus, according to work vehicle 100, electromagnetic proportional control valve 59 can generate the command pilot pressure according to the instruction from main controller 52.

In the above description, bucket cylinder 37 has been exemplified as an example of the actuator, though not limited thereto. The actuator may be other cylinders for work implement 4 such as boom cylinder 35 or arm cylinder 36. Alternatively, the actuator may be an actuator (hydraulic motor) for rotating revolving unit 3.

(2) Oil is supplied to operation apparatus 51 from pilot pump 56B through operation apparatus oil passage 61.

According to such a configuration, a single common hydraulic pressure source can be used to supply oil to both operation apparatus 51 and electromagnetic proportional control valve 59.

(3) In work vehicle 100, the oil having passed through operation apparatus 51 is prevented from flowing into pilot oil passage 58 but is returned to tank 63 configured to store the oil utilized in pilot pump 56B. According to such a configuration, the oil having passed through operation apparatus 51 is not utilized for generation of the command pilot pressure. Thus, work vehicle 100 can generate command pilot pressure utilizing the hydraulic pressure supplied from pilot pump 56B.

(4) Main controller 52 has a bucket control function of keeping the bucket angle relative to the main body of work vehicle 100 constant. When operation apparatus 51 accepts the operator's operation (lever operation) during execution of the bucket control function, main controller 52 changes the bucket angle to the angle based on the operator's operation.

According to such a configuration, during execution of the bucket control function, the operator's operation can be prioritized over execution of the bucket control function.

(5) When the operator's operation for operation apparatus 51 is accepted during execution of the bucket control function, main controller 52 temporarily stops the bucket control function and causes bucket 7 to pivot based on the operator's operation. When the operator's operation is ended, main controller 52 keeps the bucket angle that is formed when the operator's operation is ended.

According to such a configuration, the bucket control function can be resumed at the bucket angle formed when the operator's operation is ended.

(6) Operation apparatus 51 has control lever 511. The above-described operator's operation is to operate control lever 511.

According to such a configuration, during execution of the bucket control function, the operator's operation for control lever 511 can be prioritized over execution of the bucket control function. Furthermore, the bucket control function can be resumed at the bucket angle formed when the operation of control lever 511 is ended.

<H. Modifications>

(First Modification)

In the above-described embodiment, an explanation has been given with regard to the configuration in which, when the operator's operation for operation apparatus 51 is accepted during execution of the bucket control function, the bucket control function is temporarily stopped, and when the operator's operation is ended, the bucket control is resumed, though not limited thereto.

For example, when operation apparatus 51 accepts the operator's operation during execution of the bucket control function, main controller 52 may end execution of the bucket control function. In this case, even when the operator's operation is ended, main controller 52 does not resume the bucket control function.

According to such a configuration, in an aspect in which the operator determines that bucket control does not need to be performed, the operator can turn off the bucket control function only by operating operation apparatus 51.

(Second Modification)

The following is an explanation about the configuration in which control lever 511 includes a push-button switch that is operated to thereby give priority to the operator's operation during execution of the bucket control function.

Figure 7:
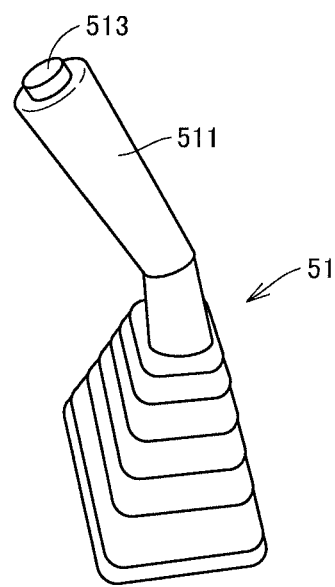
FIG. 7 is a perspective view of an operation apparatus.

FIG. 7 is a perspective view of operation apparatus 51.

As shown in FIG. 7, control lever 511 of operation apparatus 51 includes a push-button switch 513. As shown in FIG. 7, the position of push-button switch 513 may be located at the upper end (top) of control lever 511 or may be located on the side portion of control lever 511.

When push-button switch 513 is pressed down during execution of the bucket control function, during pressing of push-button switch 513, main controller 52 temporarily stops the bucket control function and performs control for keeping the cylinder length of bucket cylinder 37 constant. Thereby, angle β formed between bucket 7 and arm 6 is kept constant. In this case, bucket angle α sequentially changes. When pressing of push-button switch 513 is ended, the bucket control function is resumed at bucket angle α that is formed at this time.

According to such a configuration, in the state where the bucket cylinder length is kept constant, the operator can change bucket angle α relative to the main body of work vehicle 100.

The above description has been given with reference to the configuration in which push-button switch 513 is provided in control lever 511 on the right side, though not limited thereto. Push-button switch 513 may be provided in control lever 519 on the left side. Alternatively, for example, push-button switch 513 may be provided in dashboard 17 or the like.

The embodiments disclosed herein are merely by way of example, but not limited only to the above description. The scope of the present invention is defined by the terms of the claims, and is intended to include any modifications within the meaning and scope equivalent to the terms of the claims.

REFERENCE SIGNS LIST 1 traveling unit, 3 revolving unit, 4 work implement, 5 boom, 6 arm, 7 bucket, 8 operator's compartment, 9 operator's seat, 10 travel operation unit, 11, 12 travel lever, 13, 14 travel pedal, 17 dashboard, 20 lock lever, 35 boom cylinder, 36 arm cylinder, 37 bucket cylinder, 46 arm pin, 47 bucket pin, 51 operation apparatus, 52 main controller, 53 monitor device, 54 engine controller, 55 engine, 56A main pump, 56B pilot pump, 57 swash plate drive apparatus, 58 pilot oil passage, 59 electromagnetic proportional control valve, 60 main valve, 61 operation apparatus oil passage, 62 pressure sensor, 63 tank, 64 hydraulic oil passage, 100 work vehicle, 511, 519 control lever, 512 operation detector, 513 push-button switch, 601 spool, 602 pilot compartment, 800 design surface, 802 inclined surface.

The invention claimed is:

1. A work vehicle comprising:
a hydraulic operation apparatus for operating an actuator;
a controller configured to generate a command current in accordance with an amount of operation of the operation apparatus;
an electromagnetic proportional control valve configured to generate command pilot pressure in accordance with the command current; and
a valve configured to adjust a flow rate of hydraulic oil for operating the actuator based on the command pilot pressure,
the electromagnetic proportional control valve being provided in a first oil passage that connects a hydraulic pressure source and the valve, and being configured to utilize hydraulic pressure supplied from the hydraulic pressure source to generate the command pilot pressure,
the operation apparatus being provided in a second oil passage that is different from the first oil passage.

2. The work vehicle according to claim 1, wherein oil is supplied to the operation apparatus from the hydraulic pressure source through the second oil passage.

3. The work vehicle according to claim 1, further comprising a tank in which oil utilized by the hydraulic pressure source is stored, wherein
oil after passing through the operation apparatus is prevented from flowing into the first oil passage and is returned to the tank.

4. The work vehicle according to claim 1, further comprising a bucket, wherein
the actuator is a bucket cylinder configured to receive the hydraulic oil from the valve to cause the bucket to pivot,
the controller has an automatic control function of keeping a bucket angle relative to a main body of the work vehicle constant, and
when the operation apparatus accepts an operator's operation during execution of the automatic control function, the controller changes the bucket angle to an angle based on the operator's operation.

5. The work vehicle according to claim 4, wherein
when the controller accepts the operator's operation for the operation apparatus during execution of the automatic control function, the controller temporarily stops the automatic control function and causes the bucket to pivot based on the operator's operation, and
when the operator's operation is ended, the controller keeps the bucket angle that is formed when the operator's operation is ended.

6. The work vehicle according to claim 4, wherein
when the operation apparatus accepts the operator's operation during execution of the automatic control function, the controller ends execution of the automatic control function.

7. The work vehicle according to claim 4, wherein
the operation apparatus includes a control lever, and
the operator's operation is to operate the control lever.

8. The work vehicle according to claim 4, further comprising a push-button switch, wherein
when the push-button switch is pressed during execution of the automatic control function, during pressing of the push-button switch, the controller temporarily stops the automatic control function and performs control for keeping a cylinder length of the bucket cylinder constant.

9. A method of controlling a work vehicle,
the work vehicle including
a valve configured to adjust a flow rate of hydraulic oil for operating an actuator based on command pilot pressure,
an electromagnetic proportional control valve provided in a first oil passage that connects a hydraulic pressure source and the valve, and
a hydraulic operation apparatus for operating the actuator, the operation apparatus being provided in a second oil passage that is different from the first oil passage, the method comprising:
generating a command current in accordance with an amount of operation of the operation apparatus; and
causing the electromagnetic proportional control valve to utilize hydraulic pressure supplied from the hydraulic pressure source to generate the command pilot pressure in accordance with the command current.

10. A method of controlling a work vehicle,
the work vehicle including
a valve configured to adjust a flow rate of hydraulic oil for operating an actuator, and
an operation apparatus for operating the actuator, the method comprising:
controlling a bucket angle relative to a main body of the work vehicle to be kept constant; and
when the operation apparatus accepts an operator's operation while controlling the bucket angle to be kept constant, changing the bucket angle to an angle based on the operator's operation.

* * * * *